United States Patent [19]

Rawlings

[11] 4,196,972
[45] Apr. 8, 1980

[54] CONFIGURATION CONTROL APPARATUS

[75] Inventor: John L. Rawlings, Ridgefield, Conn.

[73] Assignee: The Perkin-Elmer Corporation, Norwalk, Conn.

[21] Appl. No.: 826,525

[22] Filed: Aug. 22, 1977

[51] Int. Cl.² .............................................. G02B 5/10
[52] U.S. Cl. .................................................... 350/295
[58] Field of Search .................... 350/295, 243, 17, 44; 343/915

[56] References Cited

U.S. PATENT DOCUMENTS

| | | | |
|---|---|---|---|
| 3,140,347 | 7/1964 | Cohen | 350/295 |
| 3,229,578 | 1/1966 | Smith | 350/295 |
| 3,237,937 | 3/1966 | Hoppe | 350/295 |
| 3,254,342 | 5/1966 | Miller | 350/295 |
| 4,066,343 | 1/1978 | Scott | 350/295 |

Primary Examiner—John K. Corbin
Assistant Examiner—B. W. de los Reyes
Attorney, Agent, or Firm—S. A. Giarratana; F. L. Masselle; E. T. Grimes

[57] ABSTRACT

At least two posts are extended from a deformable specimen and individual force couples are applied through each post to vary the configuration of the specimen. Specific embodiments are disclosed wherein the specimen is a flexible mirror in an optical system; in one form thereof, parallelogram linkages apply the force couples to the posts, and in another form thereof, extension assemblies are mounted between the posts which are each actuated by a remotely disposed actuator through a flexible drive.

18 Claims, 7 Drawing Figures

CONFIGURATION CONTROL APPARATUS

BACKGROUND OF THE INVENTION

The present invention relates to configuration control apparatus for applying force couples to distort a deformable specimen and particularly, the application of such apparatus to electromagnetic radiation or optical elements. To vary the configuration of deformable specimens is generally important in many fields, such as antennae in communications and reflective elements in optical systems. Although configuration control apparatus for deformable specimens are known in these fields, most such apparatus distorted the specimen by applying forces normal to a surface thereon with the resulting reaction forces being transmitted through the supporting structure thereof. To avoid transmission of the reaction forces, apparatus has recently been developed which distorts the specimen by applying equal and opposite moments thereto through posts extending perpendicularly therefrom with force producing actuators being disposed between the posts, as described in U.S. Pat. application Ser. No. 677,219, now Pat. No. 4,066,343, assigned to the assignee of this invention. Because this apparatus requires two locations on the specimen for each distortion input, configuration control therewith is more complicated than necessary for many applications.

SUMMARY OF THE INVENTION

It is the general object of this invention to control the configuration of a deformable specimen by applying couples thereto through individual posts.

It is a specific object of this invention to control the surface contour of an optical element therewith.

It is a further object of this invention to develop the force couples in each post thereof through parallelogram linkages.

These objects are accomplished according to the present invention by extending at least two affixed posts from the deformable specimen and connecting each post to means for applying force couples thereto. The number and arrangement of the posts depend on the nature of the specimen distortion that is required to attain the desired specimen configuration.

Flexible mirrors in optical systems are one particularly appropriate type of deformable specimen and in such applications of the invention, parallelogram linkages are utilized where the force couples are developed in the posts about axes which are perpendicular to the longitudinal axes of the posts.

In one embodiment of the invention, apparatus for controlled multiple mode distortion of a specimen is provided, which includes a plurality of spaced posts affixed to the specimen, extension assembly means mounted between the posts, and flexible drive means operatively connecting each of the extension assembly means to a remotely disposed actuator for applying a variable force between the posts, equal and opposite moments being developed from the force of each extension assembly through said posts to distort the specimen, said posts being located on the specimen to provide at least two modes of distortion therein.

In one form of the invention, the flexible drive means is a Bowden cable. Each of the extension assemblies includes a first rod having one end attached to a post. The rod carries at least two blocks, the first of said blocks being free to slide on the rod while the second is fixedly attached. A second rod is provided which has one end attached to a second spaced post. The second rod is adapted to slide freely in the second block and is fixedly attached to the first block. The wire of the Bowden cable is affixed to the first block and the casing is affixed to the second block. Each of the actuators includes an actuator bracket, and motor means mounted on the bracket carrying a pinion. A rack is mounted on the bracket, which is actuated by the pinion for sliding movement with respect to the bracket. The wire of the Bowden cable is affixed to the rack and the casing is affixed to the bracket, whereby actuation of the motor serves to displace the first rod with respect to the second rod for applying the variable force between the posts on the specimen.

In another form of the invention, the flexible drive means is a rotatable core type. The extension assembly includes a first rod having one end attached to a post. This rod carries at least one block fixedly attached thereto, and a rack is fixedly mounted thereon. A second rod is provided which has one end attached to a second spaced post. The second rod is adapted to slide freely in the block, and a pinion is rotatably mounted on the second rod for engagement with the rack. The rotatable core of the flexible drive means is adapted to drive the pinion and the casing for the rotatable core is fixedly attached to the block. The actuator includes an actuator bracket, motor means mounted on the bracket for driving the rotatable core of the flexible drive means and the casing for the rotatable core is fixedly attached to the bracket.

There has thus been outlined rather broadly the more important features of the invention in order that the detailed description thereof that follows may be better understood, and in order that the present contribution to the art may be better appreciated. There are, of course, additional features of the invention which will be discussed more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

Several embodiments of the invention have been chosen for purposes of illustration and description, and are shown in the accompanying drawings forming a part of this specification.

BRIEF DESCRIPTION OF THE DRAWINGS

The manner in which these and other objects of the present invention are achieved will be best understood by reference to the following description, the appended claims, and the attached drawings wherein:

DETAILED DESCRIPTION OF THE PREFERRED EMBODIMENTS

Although the configuration control apparatus of this invention could be applied to deformable specimens having any undistorted configuration, for the sake of a clear and concise disclosure, only embodiments relating to substantially flat specimens will be disclosed. In all embodiments of this invention however, at least two posts are affixed to extend from the deformable specimen and a means for applying a variable couple is connected to each post. Of course, each couple is transferred to the specimen which is distorted in some manner thereby. Consequently, the posts are located on the specimen in accordance with the distortion that is necessary to attain the desired configurations for the particular application. In each application, the distortion characteristics of the specimen depend on its undistorted configuration, its supporting arrangement, whether the posts extend from either its major or minor surface and whether the couples are applied about the longitudinal axes of the posts or about axes perpendicular to those longitudinal axes. Therefore, the possible embodiments of this invention are certainly too numerous to disclose in this application but the full scope of the invention will be really understood by those skilled in the art from the embodiments which are disclosed. Posts are extended perpendicularly from one major surface of a substantially flat specimen and couples are applied to each post about axes which are perpendicular to the longitudinal axes thereof in the disclosed embodiments. However, the artisan will understand without further explanation that the posts may be extended in any direction from the specimen and the couples may be applied about any axis of the posts within the scope of the invention.

Figure 1:
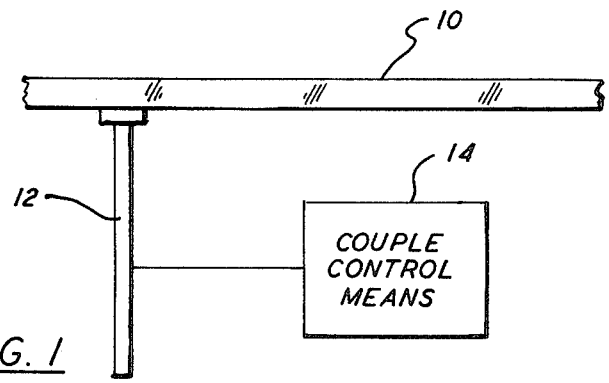
FIG. 1 generally illustrates the apparatus of this invention wherein force couples are transferred through individual posts to deform a specimen.

As is illustrated in FIG. 1, a deformable specimen 10 is fixedly mounted by a supporting structure (not shown) in all embodiments of this invention, while at least two posts 12 are affixed to extend from the specimen 10. A control means 14 for applying a variable couple is connected to each of the posts 12 which transfer the couples to the specimen 10. Because the specimen 10 is fixedly mounted, it reacts to the couples by distorting in some manner and therefore, the posts 12 are located on the specimen 10 in accordance with the distortion required to attain the desired configurational control thereof.

Figure 2:
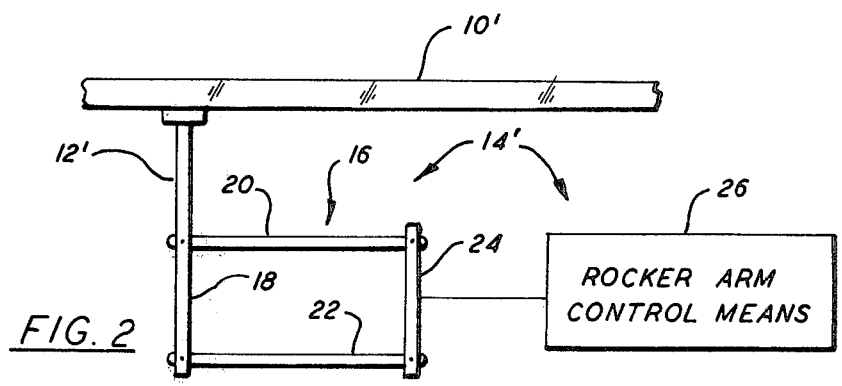
FIG. 2 illustrates a specific embodiment of the invention wherein the forces of each couple are applied perpendicularly across the longitudinal axis of the individual posts by a parallelogram linkage.

The flat configuration of the specimen 10 was selected for discussing the configuration control apparatus of this invention because it is fundamental to many applications. One such application is to distort a mirror element within an optical system so that the contour of its reflective surface is varied, and a particular couple control means 14' for such an application is illustrated in FIG. 2. where similar elements are designated with the same numerals as those used in FIG. 1, except that a prime (') is added thereto. The couple control means 14' includes at least one parallelogram linkage 16 for each post 12' with the couple arm portion of the post 12' being a link 18 therein. That is, the couple arm is the distance which separates the forces in a couple. In addition, each parallelogram linkage 16 includes links 20 and 22 which each have one end thereof pivotally affixed separately to the ends of the link 18 and the other end thereof pivotally affixed separately to the ends of a rocker arm 24. The couple control means 14' also includes control means 26 for turning each rocker arm 24 about an axis perpendicular to the plane which contains its parallelogram linkage 16. The link 18 always remains parallel to the rocker arm 24 in the parallelogram linkage 16 so that a couple is developed in the post 12' by turning the rocker arm 24, such couples being transmitted through the posts 12' to distort the flat mirror 10'.

Figure 3:
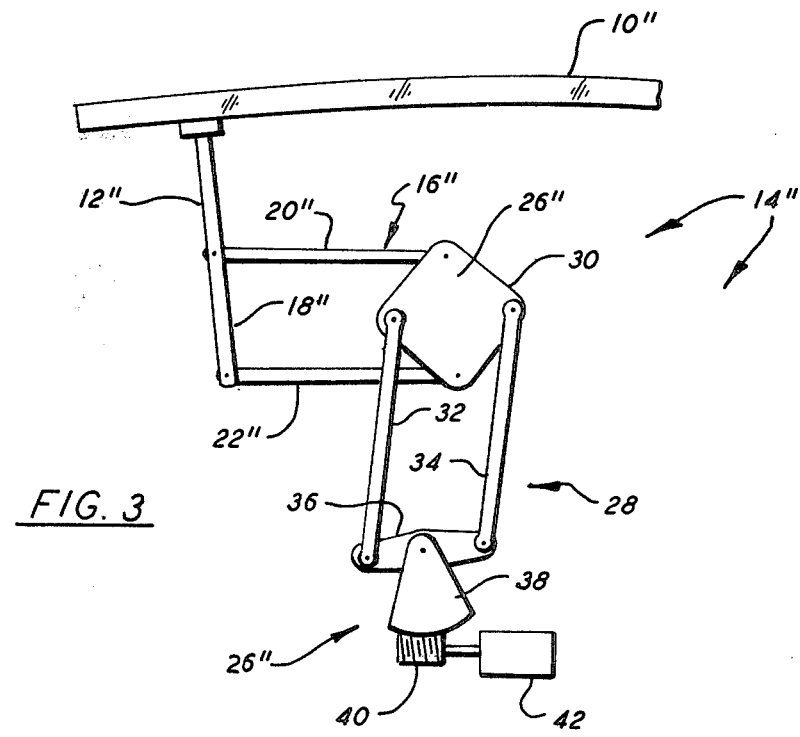
FIG. 3 illustrates another embodiment of this invention wherein a second parallelogram linkage is incorporated to modify the embodiment of FIG. 2 and wherein the specimen deformation is controlled by a stepper motor.

One arrangement of the rocker arm control means 26" that is particularly appropriate for use in optical systems is shown in FIG. 3 where similar elements are designated with the same numerals as those used in FIG. 2, except that a double prime (") is added thereto. In this arrangement, a second parallelogram linkage 28 is included which has a pivot plate 30 serving as one link therein and also as the rocker arm 26" in the first parallelogram linkage 16". In addition, the second parallelogram linkage 28 includes parallel links 32 and 34, which are pivotally affixed at space locations on the pivot plate 30 as well as being pivotally affixed at spaced locations on a rocker arm 36. At a central location thereon, the rocker arm 36 is pivotally affixed about an axis perpendicular to the plane which contains the parallelogram linkage 28, and a gear sector 38 is rigidly affixed thereto at that location. The gear sector 38 engages a worm gear 40 which is connected for rotation by a stepper motor 42. The portion of the pivot plate 30, which serves as the link in the second parallelogram linkage 28, always remains parallel to the rocker arm 36 so that when the stepper motor 42 turns the rocker arm 36 through the worm gear 40 and the gear sector 38, the pivot plate 30 also turns. Because the rocker arm 26" in the first parallelogram linkage 16" is also a portion of the pivot plate 30, it turns therewith to distort the flat mirror 10" through the post 12", as shown in FIG. 3.

In the embodiments of the invention described in FIGS. 4 to 7, an electromagnetic radiation element, such as a flexible mirror 44, is mounted by a supporting structure (not shown). A plurality of mirror posts 46 are affixed as at 48 to extend from the flexible mirror, and control means indicated at 50 are provided for applying various forces to the posts for controlling the configuration of the mirror. The free ends of the posts, or cantilevers, are each connected to an extensible assembly 52 of rods and blocks by thin flexible struts 54. In some installations, it is desirable to utilize pivots in place of the flexible struts.

Figure 5:
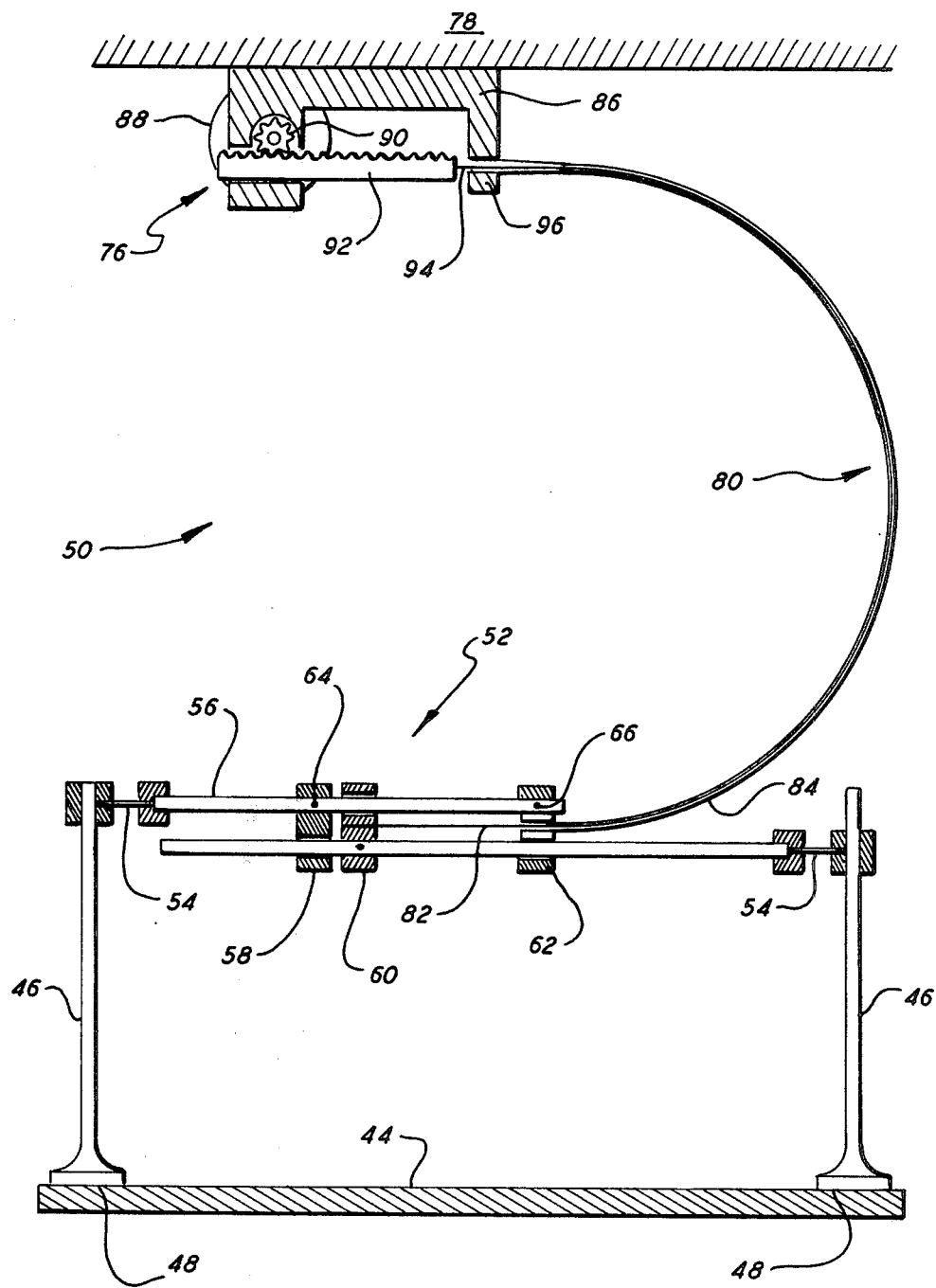
FIG. 5 is an enlarged side elevation, partially in section, showing details of one form of the embodiment of FIG. 4.
Figure 6:
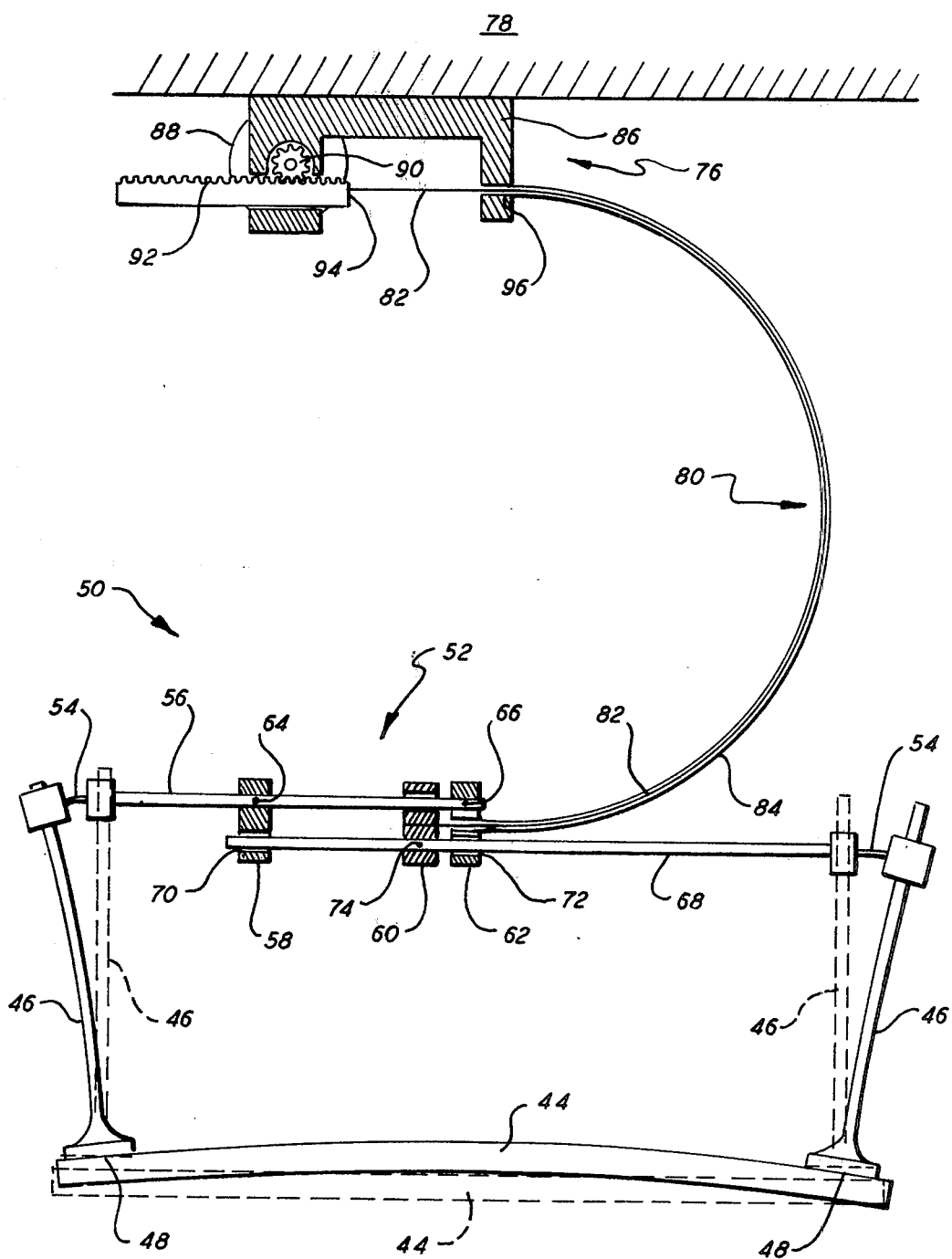
FIG. 6 is an enlarged side elevation, partially in section, of the apparatus of FIG. 5 showing the apparatus in a second operative position.

In the embodiment of FIGS. 5 and 6, the extensible assembly 52 includes a first rod 56 having one end attached to a mirror post. This rod carries three blocks, 58, 60, and 62, the center block 60 being free to slide on the rod while the other two blocks 58 and 62 are pinned to the rod as at 64 and 66, respectively. A second rod 68 is attached to a second, spaced, mirror post in a like manner. The second rod is adapted to slide freely in the two outer blocks 58 and 62 as at 70 and 72, respectively, but is pinned to the center block 60 at 74.

Figure 4:
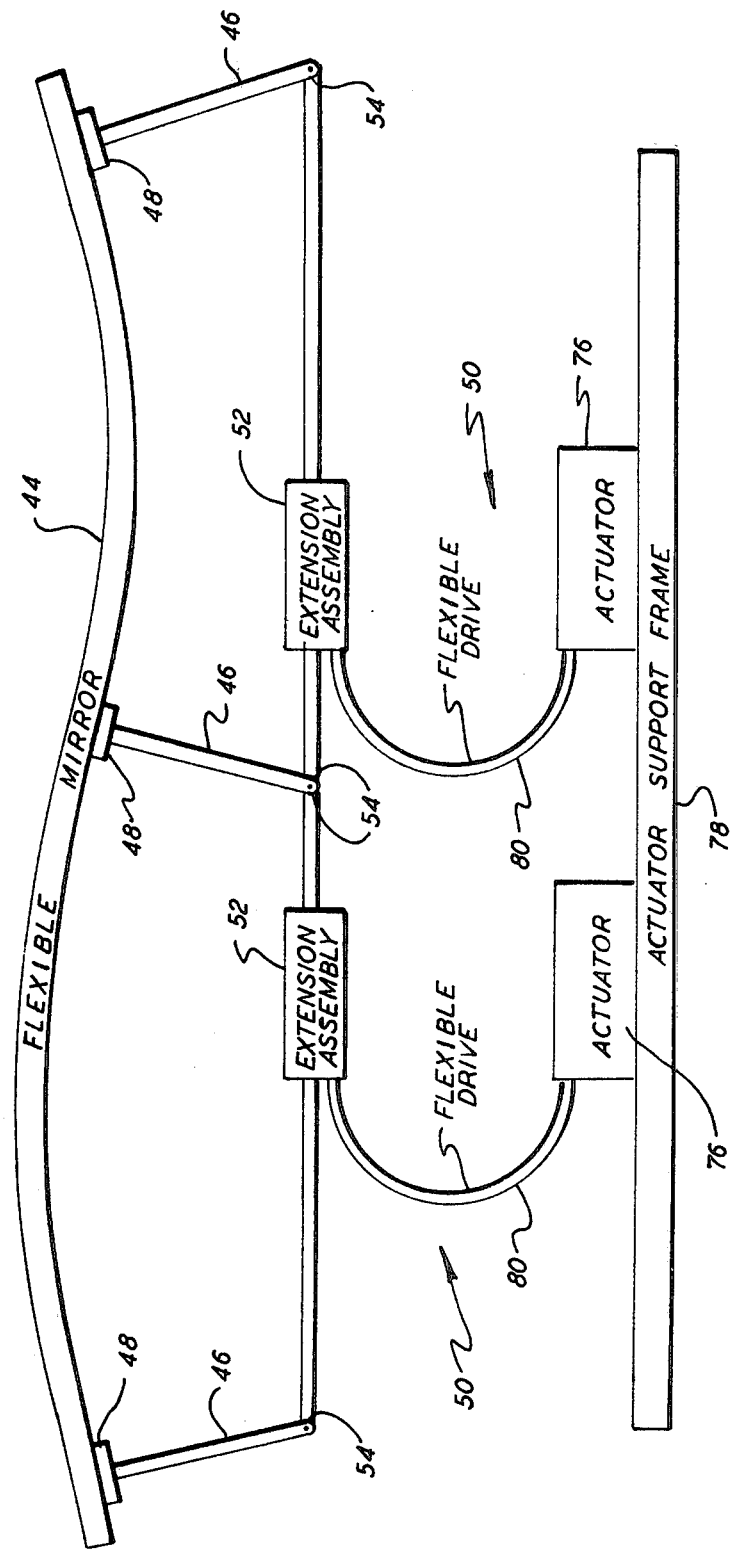
FIG. 4 is a schematic side elevation showing apparatus according to another embodiment of the invention.

Referring to FIG. 4, a remotely disposed actuator of prime mover 76 is attached to a rigid support frame 78 for each extension assembly 52. A flexible drive 80 serves to transfer motion and forces from the actuator 76 to the extension assembly 52 to introduce pairs of opposing couples into the flexible mirror with a minimum of reaction on the mirror support and a minimum mass attached to the mirror.

As seen in the embodiment of FIGS. 5 and 6, the flexible drive 80 is in the form of a push-pull or Bowden type, which comprises a small diameter wire 82 that is free to slide within a flexible casing 84. The end of the wire 82 is anchored in the center block 60 and the end of the casing 84 is anchored in the outer block 62. The other end of the Bowden cable is connected to the actuator 76, which comprises an actuator bracket 86, carrying a gearhead motor 88 having a pinion 90 for engaging a toothed rack 92 that is free to slide in the bracket 86. The end of the Bowden cable is anchored to the end of the rack at 94 and the end of the flexible casing 84 is anchored to the actuator bracker 86 at 96.

In operation, rotation of the pinion 90 causes the rack to pull the wire 82 out of the casing 84 at the actuator end. This, in turn, reduces the distance between the central block 60 and the outer block 62 of the extension assembly 52, thereby causing it to elongate and push the two mirror posts apart, which introduces couples into the mirror at the points of attachment of the posts. This operation is illustrated in FIG. 6 wherein the initial positions of the mirror posts and the mirror are indicated by broken lines and their final position is indicated by solid lines, the deflection of the mirror being exaggerated for purposes of clarity. Rotation of the motor 88 in the opposite direction reverses the aforesaid process to cause the mirror posts and mirror to move in the opposite directions.

Figure 7:
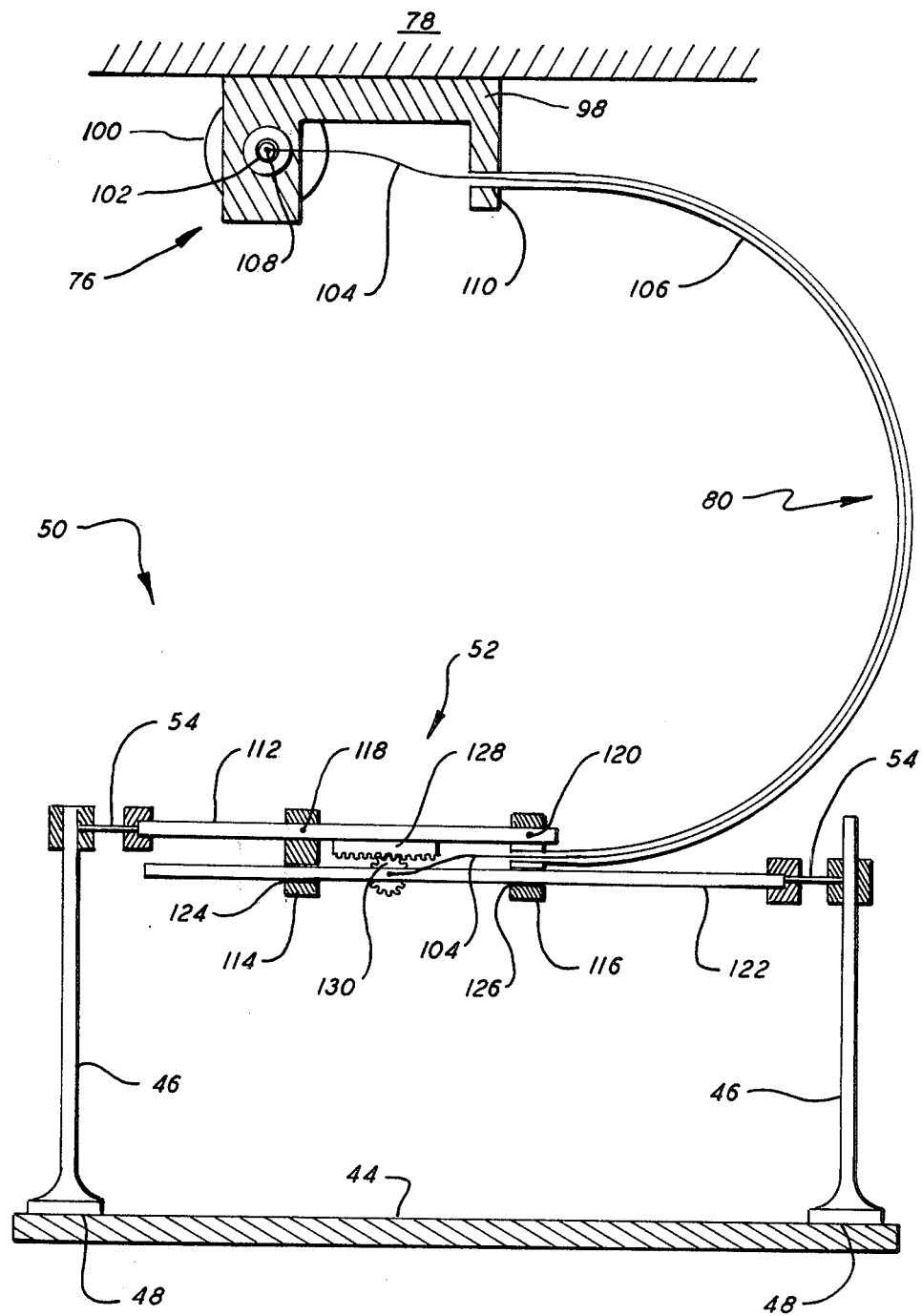
FIG. 7 is an enlarged side elevation, partially in section, showing details of a second form of the embodiment of FIG. 4.

In the embodiment of the invention illustrated in FIG. 7, the remotely disposed actuator 76 comprises an actuator bracket 98 attached to the actuator support frame 78. The bracket carries a motor 100 having a motor shaft 102. The flexible drive 80 is of a rotatably core type, which comprises a rotatable core 104 that is free to rotate in a flexible casing 106. The end of the core is coupled to the motor shaft at 108 for rotation and the end of the casing 106 is anchored in the actuator bracket at 110. In this embodiment, the extension assembly 52 comprises a first rod 112 connected to a mirror post 46 by a flexible strut 54 or pivot. This rod carries two blocks 114 and 116 which are pinned thereto at 118 and 120, respectively. A second rod 122 is attached to a second, spaced, mirror post in a like manner. The second rod is adapted to slide freely in the blocks 114 and 116 as at 124 and 126, respectively. A rack 128 is fixedly mounted on the first rod 114, and a corresponding pinion 130 is mounted for rotation on the second rod 122. This pinion is coupled to the rotatable core 104 so that rotation of the motor 100 causes corresponding rotation of the pinion 130.

In operation, rotation of the pinion 130 in one direction along the rack 128 causes the extension assembly 52 to elongate and push the two mirror posts apart, while rotation in the opposite direction causes the extension assembly to contract and thereby urge the mirror posts towards each other.

It will be appreciated that in some installations, there may be as many as one hundred or more mirror posts employed in order to obtain a desired mirror configuration. In such installations, it is particularly desirable to employ remote actuators for purposes of minimizing the mass rigidity attached to the mirror.

Although certain particular embodiments of the invention are herein disclosed for purposes of explanation, various modifications thereof, after study of the specification, will be apparent to those skilled in the art to which the invention pertains.

What is claimed is:

1. Apparatus for controlling the configuration of a deformable optical element which is fixedly mounted by a supporting structure, comprising:
   at least two posts affixed to the optical element and extending therefrom; and
   control means for applying a variable couple to each said post at a position spaced from the optical element, said couples being transferred through said posts to distort the optical element, said posts being located on the optical element in accordance with the distortion that is required to attain the desired configuration control thereof.

2. The apparatus of claim 1 wherein the optical element has a reflective surface and the configuration thereof is controlled to vary the contour of said reflective surface.

3. The apparatus of claim 1 wherein said couple control means applies couples about axes perpendicular to the longitudinal axes of said posts.

4. The apparatus of claim 3 wherein said couple control means includes at least one parallelogram linkage, for each of said posts, the couple arm portion on each of said posts being one link in said parallelogram linkages.

5. The apparatus of claim 3 wherein said couple control means includes at least one linkage having two parallelogram linkages disposed therein and having a common member serving as a link in each parallelogram linkage, the couple arm portion on each of said posts being one link in one of said parallelogram linkages.

6. Apparatus for controlling the configuration of a flexible mirror which is fixedly mounted by a supporting structure in an optical system comprising:
   at least two posts affixed to extend from the mirror and a linkage connected to each said post for applying a force couple therein about an axis perpendicular to the longitudinal axis thereof, each said linkage including:
   a first pair of parallel links each having one end pivotally affixed at separate locations along the longitudinal axis of one said post;
   a pivot plate having the other ends on said first pair of parallel links pivotally affixed thereto at separate locations thereon;
   a second pair of parallel links each having one end pivotally affixed to said pivot plate at separate locations thereon;
   a rocker arm having each end thereof pivotally affixed separately to the other ends on said second pair of parallel links; and
   control means for turning said rocker arm.

7. The apparatus of claim 6 wherein a central location of said rocker arm is pivotally affixed to the supporting structure and said rocker arm control means includes a gear sector, a worm gear, and a motor; said gear sector being affixed to said rocker arm at the centrally located pivot point thereof and engaging with said worm gear; said motor being connected to rotate said worm gear in turning said rocker arm through said gear sector.

8. Apparatus for controlled multiple mode distortion of a flexible optical element, comprising:

a plurality of spaced posts affixed to the optical element and extending therefrom;
extension assembly means mounted between said posts;
a remotely disposed actuator for each extension assembly means; and
flexible drive means operatively connecting said actuators to said extension assembly means respectively for applying a variable force between said posts, equal and opposite moments being developed from the force of each said extension assembly means through said posts to distort the optical element, said posts being located on the optical element to provide at least two modes of distortion therein.

9. Apparatus according to claim 8 wherein said actuators are mounted on a fixed common actuator support frame.

10. Apparatus according to claim 8 wherein said actuators are connected to said posts through flexible struts, respectively.

11. Apparatus according to claim 8 wherein said flexible drive means is a Bowden cable.

12. Apparatus according to claim 11 wherein each of said extension assembly means includes a first rod having one end attached to one of said posts, said rod carrying at least two blocks, the first of said blocks being free to slide on the rod while the second of said blocks is fixedly attached to the rod;
a second rod having one end attached to a second of said posts, said second rod being adapted to slide freely in the second block and being fixedly attached to the first block;
the wire of the Bowden cable being affixed to said first block and the casing being affixed to said second block.

13. Apparatus according to claim 12 wherein each of said actuators includes an actuator bracket, motor means mounted on said bracket carrying a pinion, a rack mounted on said bracket for sliding movement actuated by said pinion, the wire of said Bowden cable being affixed to said rack and the casing being affixed to said bracket, whereby actuation of said motor means serves to displace said first rod with respect to said second rod for applying said variable force between said posts.

14. Apparatus according to claim 13 wherein said rods are connected to said posts through flexible struts, respectively.

15. Apparatus according to claim 8 wherein said flexible drive means is a rotatable core type.

16. Apparatus according to claim 15 wherein each of said extension assembly means includes a first rod having one end attached to one of said posts, said rod carrying at least one block fixedly attached thereto;
a rack fixedly mounted on said rod;
a second rod having one end attached to a second of said posts, said second rod being adapted to slide freely in said block, a pinion rotatably mounted on said second rod for engagement with said rack, said rotatable core of the flexible drive means being adapted to drive said pinion, and a casing for said rotatable core being fixedly attached to said block.

17. Apparatus according to claim 16 wherein each of said actuators includes an actuator bracket, motor means mounted on said bracket for driving said rotatable core of the flexible drive means, the casing for the rotatable core being fixedly attached to said bracket.

18. Apparatus according to claim 17 wherein said rods are connected to said posts through flexible struts, respectively.

* * * * *